(12) United States Patent
Sison et al.

(10) Patent No.: US 8,204,802 B2
(45) Date of Patent: Jun. 19, 2012

(54) FUEL ACCOUNTING SYSTEM AND METHODS

(75) Inventors: Sheila Sison, Louisville, KY (US); Jason Krekel, Louisville, KY (US); Kim Fogle, Louisville, KY (US); Scott Fairfield, Crestwood, KY (US); Subbiah Krishna, Louisville, KY (US); Marie Ryan, Bucker, KY (US); Ted M. Routt, Louisville, KY (US); Mark Slafkes, Louisville, KY (US); John Napier, Louisville, KY (US); Jeff Matz, Louisville, KY (US); Dave Moessner, Louisville, KY (US); Matt Miles, Shepherdsville, KY (US)

(73) Assignee: United Parcel Service of America, Inc. GA (US)

(*) Notice: Subject to any disclaimer, the term of this patent is extended or adjusted under 35 U.S.C. 154(b) by 523 days.

(21) Appl. No.: 11/961,291

(22) Filed: Dec. 20, 2007

(65) Prior Publication Data

US 2009/0164347 A1   Jun. 25, 2009

(51) Int. Cl.
 G07B 17/00 (2006.01)
 G07F 19/00 (2006.01)
(52) U.S. Cl. ......................................................... 705/30
(58) Field of Classification Search ...................... 705/30
 See application file for complete search history.

(56) References Cited

U.S. PATENT DOCUMENTS

| | | | |
|---|---|---|---|
| 4,414,157 A | 11/1983 | Iwama et al. | |
| 5,339,875 A | 8/1994 | English et al. | |
| 5,530,258 A | 6/1996 | Crowne | |
| 5,627,380 A | 5/1997 | Crowne | |
| 5,723,870 A | 3/1998 | Crowne et al. | |
| 5,814,830 A | 9/1998 | Crowne | |
| 5,982,297 A | 11/1999 | Welle | |
| 6,037,704 A | 3/2000 | Welle | |
| 6,078,850 A | 6/2000 | Kane et al. | |
| 6,119,058 A | 9/2000 | Anderberg | |
| 6,154,658 A | 11/2000 | Caci | |
| 6,347,723 B1 | 2/2002 | Barlian et al. | |
| 6,615,656 B1 | 9/2003 | Breed et al. | |
| 6,965,816 B2 | 11/2005 | Walker | |
| 6,972,677 B2 | 12/2005 | Coulthard | |
| 6,988,026 B2 | 1/2006 | Breed et al. | |
| 7,059,167 B2 | 6/2006 | Nestvall | |
| 8,055,526 B2 * | 11/2011 | Blagg et al. | 705/7.14 |
| 2003/0109973 A1 * | 6/2003 | Hensey et al. | 701/35 |
| 2004/0107028 A1 * | 6/2004 | Catalano | 701/2 |
| 2004/0149003 A1 | 8/2004 | Nestvall | |

(Continued)

OTHER PUBLICATIONS

Office Action from Canadian Application No. 2,639,464 dated Aug. 6, 2010.

(Continued)

*Primary Examiner* — Russell S Glass
(74) *Attorney, Agent, or Firm* — Alston & Bird LLP

(57) ABSTRACT

Various embodiments of the present invention provide systems and methods for fuel accounting that enables an organization to verify that fueling being paid for has in fact been dispensed into their aircraft. In particular, various embodiments provide systems and methods to verify whether a particular fueling event occurred. In addition, various embodiments provide systems and methods to facilitate the front-end data capture of a fueling event by the organization operating the aircraft via a data pathway not under control of a fueling agent. Furthermore, various embodiments provide for systems and methods to allow an organization operating aircraft to verify fuel uplifted and fuel inventory over a selected period of time.

12 Claims, 8 Drawing Sheets

U.S. PATENT DOCUMENTS

| | | |
|---|---|---|
| 2004/0260470 A1 | 12/2004 | Rast |
| 2005/0192727 A1 | 9/2005 | Shostak et al. |
| 2005/0267673 A1 | 12/2005 | Blagg et al. |
| 2005/0273218 A1 | 12/2005 | Breed et al. |
| 2006/0038077 A1 | 2/2006 | Olin et al. |
| 2006/0157145 A1* | 7/2006 | Hillam et al. .................. 141/198 |
| 2006/0180371 A1 | 8/2006 | Breed et al. |
| 2006/0181421 A1 | 8/2006 | Forcier et al. |
| 2006/0187026 A1 | 8/2006 | Kochis |
| 2006/0212194 A1 | 9/2006 | Breed |

OTHER PUBLICATIONS

SAP, "Oil and Gas Secondary Distribution," http://www.sap.com/industries/oil-gas/pdf/bwp_sb_oil_gas_secondary_distribution.pdf, Apr. 25, 2005.

Ultra Energy, "Industrial Strength Tool for Managing Oil & Gas Supply Chain," http://www.ultra.si/uploads/files/UltraSupplyChain.pdf, Sep. 3, 2004.

* cited by examiner

FUEL ACCOUNTING SYSTEM AND METHODS

BACKGROUND OF THE INVENTION

1. Field of the Invention

The disclosed invention generally pertains to the field of fuel accounting jet fuel, and more specifically, to a system and method for verifying that fuel to be paid for has in fact been received and dispensed to an organization's designated equipment.

2. Description of the Related Art

There has been a long felt need among organizations operating aircraft to better record, validate, and verify the amount of fuel dispensed from a fueling agent into an aircraft. Typically, an organization's method for collecting such data is paper-based fuel tickets provided directly by the fueling agent at the airport where the aircraft is refueled. In many cases, the fuel tickets are received at several different airports and are sent to a central location and manually entered into an accounting system. This process can lead to key entry errors, lost tickets, and critical time loss waiting for fuel tickets to arrive at the central location to be processed. This problem is even more prevalent at many International airports where organizations may have fewer personnel on hand to handle fuel tickets and make sure they are properly processed.

In addition, these organizations are relying on data supplied by the fueling agent without any independent data to verify what is received from the fueling agent is accurate. This can lead to inaccuracy in fuel dispensed, i.e., uplifted, into aircraft and added fuel expense, having an enormous impact on the organization's profitability. Fuel expense is a major cost for organizations operating aircraft as demonstrated in statistics reported by the United States Department of Transportation Bureau of Transportation Statistics stating airline's fuel uplifted for 2006 was over seventeen billion gallons at an expense of thirty-four billion dollars. At times when fuel prices increase, these inaccuracies will become more of a factor in an organization operating aircraft's profitability.

Attempts have been made to better record fueling data as disclosed in U.S. Pub. No. 2005/0267673 entitled "Multiple Fueler Operations for Fuel Information Messaging System." This application teaches a fuel management system for fueling aircraft that enables multiple fueling agents to service an aircraft simultaneously. The system tracks and reports the amount of fuel provided by each fueling agent for determination of the total amount of fuel dispensed to the aircraft. Each fueling agent reads the starting and ending fuel gauge or dipstick readings as well as the amount of fuel dispensed and uses a handheld Fueling Agent Client Device to transmit fuel gauge readings and the amount of fuel dispensed for the purpose of producing a fuel ticket in hard copy or electronic form for delivery to the aircraft pilot. Though the amount of fuel dispensed into the aircraft is validated, it is validated based on data provided by the fueling agent(s). In addition, the end result is the production of a fuel ticket that does not address the need for front-end data capture. Thus, in the application, there is no front-end data capture of a fueling event and no information flow for reporting the amount of fuel dispensed into an aircraft that is not under the control of the fueling agent(s).

Likewise, U.S. Pat. No. 6,119,058 entitled "Method and Systems for Controlling the Service for an Aircraft" teaches a system with a central computer that receives information from the administrative database of the airport for purposes of servicing the aircraft while parked at an airport and downloads this information to several local computer units that are stationed in servicing units. This information can then be used by the servicing units to automatically service the aircraft such as refueling. Once the servicing is complete, the local computer unit transmits information received during servicing back to the central computer. In the case of refueling, the central computer can then calculate the amount of fuel dispensed and create a fuel ticket. Though the patent addresses a concern of better servicing aircraft by minimizing the chance for human error, it still does not address the airlines concerns over better fuel accounting and affording them more control over verifying what fuel is dispensed into their aircraft.

Thus a need in the art exists to facilitate the front-end data capture and validation of a fueling event and more specifically the front-end data capture and validation of a fueling event by the organization operating the aircraft via a data pathway not under control of a fueling agent. In addition to verifying that fuel to be paid for has in fact been dispensed for better fuel management, such a system and method would ideally reduce the amount of personnel needed, facilitate timely fuel data, reduce missing fuel tickets, increase airport accountability, increase fuel data integrity, increase visibility of timely fuel data to such business functions as accounting, inventory management and procurement, increase accuracy of fuel related planning decisions, provide more efficient and accurate data capture, or combinations of one or more of these objectives.

BRIEF SUMMARY OF THE INVENTION

Various embodiments of the present invention provide systems and methods for fuel accounting that enables an organization to verify that fuel being paid for has in fact been received, stored, and dispensed into company designated equipment. According to various embodiments, the systems and methods provide an apparatus and process to verify whether a particular fueling event occurred. Specifically, various embodiments provide an apparatus and process for front-end data capture of a fueling event by the organization operating the aircraft via a data pathway not under control of a fueling agent. In addition, various embodiments provide an apparatus and process for an organization operating aircraft to verify fuel uplifted and fuel inventory over a selected period of time.

In particular, according to various embodiments of the invention, a method of verifying a fueling event did occur comprises the steps of: (a) receiving a first fuel amount data for a fueling event over a communications network via a data pathway not under control of a fueling event; (b) receiving at an organization operating the aircraft a second fuel amount data derived from the fueling agent for the fueling event; (c) comparing the first fuel amount data and the second fuel amount data; and (d) determining whether to release the first fuel amount data for reconciliation with the fueling agent based on the comparing of step (c).

In various embodiments of the invention, the first fuel amount data is received from flight record data. While in other embodiments of the invention, the second fuel amount is received from a fuel ticket data. Still, in other embodiments of the invention, the fueling agent is a fixed base operator ("FBO").

According to various embodiments of the invention, a method providing an organization operating aircraft with the capability to verify fuel uplifted over a selected period of time comprising the method discussed above, wherein steps (a) through (d) are repeatedly performed for all aircraft fueling events over a selected period of time, further comprising the steps of: (e) summing the first fuel amount data for the fueling events released for reconciliation over the period of time to generate a first total fuel amount data; (f) receiving a second total fuel amount data from the fueling agent; (g) comparing the first and second total fuel amount data; and (h) determining whether to release the first fuel amount data for the fueling events released for reconciliation over the period of time to accounting based on the comparing of step (g).

While in other various embodiments of the invention, a method providing an organization operating aircraft with the capability to verify fuel inventory over a selected period of time further comprising the method described above and including the steps of: (i) receiving inventory receipts over the selected period of time issued by the fueling agent; (j) summing the inventory receipts to generate a first total inventory amount data; (k) receiving bills-of-lading over the selected period of time issued by a fuel supplier; (l) summing the bills-of-lading to generate a second total inventory amount data; (m) comparing the first and second total inventory amount data; and (n) determining whether to release supplier invoices related to the second total inventory amount data to accounting based on the comparing of the step (m).

In addition, according to various embodiments of the invention, a method of verifying that a fueling event did occur comprises the steps of: (a) receiving fueling information from a fueling agent corresponding to a fueling event for an aircraft; (b) entering the fueling information into a computer system; (c) determining with the computer system whether the fueling information matches to corresponding flight information received by a data pathway not under control of the fueling agent; (d) if the fueling information does match to the corresponding flight information, releasing the fueling event for reconciliation with the fueling agent; (e) if the fueling information does not match to the corresponding flight information, determining whether a fueling event occurred for the aircraft using the fueling information and the corresponding flight information accessible to the computer system; (f) if the determining of step (e) establishes that the fueling event did not occur for the aircraft, prohibiting further processing of the fueling event; (g) if the determining of step (e) establishes that the fueling event did occur for the aircraft, releasing the fueling event for approval; and (h) if the determining of step (g) establishes approval, releasing the fueling event for reconciliation with the fueling agent.

In various embodiments of the invention, the fueling information is key-entered into the computer system. In other embodiments of the invention, the fueling information is received electronically over a communication network or received through radio frequency ("RF") technology. Yet, in other embodiments of the invention, the determining whether the fueling information matches to corresponding flight information is performed based on one or more of origin airport, flight number, tail number, gallons of fuel, or date in respective to the fueling information and the flight information. Still, in other embodiments of the invention, the releasing of a fuel event for approval after it is determined a fueling event did occur from further investigation though initially the fueling information did not match to the corresponding flight information is performed by a person other than the person key-entering the fueling information into a computer system.

In addition, in various embodiments of the invention, a method providing an organization operating aircraft with the capability to verify fuel uplifted over a selected period of time comprising the method discussed directly above, wherein steps (a) through (h) are repeatedly performed for all fueling events over a selected period of time, further comprises the steps of: (i) following last performance of step (d), step (f) or step (h), determining a first total fuel amount by summing up fuel amounts for all of the fueling events released for reconciliation for the period of time; (j) determining whether the first total fuel amount reconciles with a second total fuel amount issued by a fueling agent for the period of time; (k) if the determination in step (j) establishes that the first total fuel amount does not reconcile with the second total fuel amount for the period of time, contacting the fueling agent to resolve inconsistency; and (l) if the determination in step (j) establishes that the first total fuel amount does reconcile with the second total fuel amount for the period of time, releasing to accounting the fueling events released for reconciliation for the period of time.

In various embodiments of the invention, the method discussed directly above, wherein the determining of step (j) comprising the sub steps: (j1) calculating an ending fuel inventory value by taking a previous period of time's ending fuel inventory value, adding a sum of the bills-of-lading for the period of time, and subtracting the sum of fuel amounts for the period of time; and (j2) comparing the ending fuel inventory value to a fueling agent's ending inventory value for the period of time.

In various embodiments of the invention, a method providing an organization operating aircraft with the capability to verify fuel inventory over a selected period of time comprising the method discussed directly above and including the steps of: (m) receiving inventory receipts over the selected period of time issued by the fueling agent; (n) determining a first total inventory amount by summing the inventory receipts; (o) receiving bills-of-lading over the selected period of time issued by a fuel supplier; (p) determining a second total inventory amount from summing the bills-of-lading; (q) determining whether the first total inventory amount reconciles with the second total inventory amount; (r) if the determination in step (q) establishes that the first total inventory amount does not reconcile with the second total inventory amount for the period to time, contacting the fueling agent to resolve inconsistency; and (s) if the determination in step (q) establishes that the first total inventory amount does reconcile with the second total inventory amount for the period of time, releasing to accounting the supplier invoices related to the second total inventory amount.

Another example, in other various embodiments of the invention, is a system of managing aircraft fuel that comprises a fueling event module. In particular, the fueling event module is adapted for receiving or accessing fueling information and flight information, determining whether one or more fueling events identified by the fueling information match to corresponding flight information over a period of time, releasing for further processing the fueling events having corresponding flight information, and prohibiting further processing of the fueling events not having corresponding flight information.

In addition, in various embodiments, the system may include a total fuel uplifted module adapted for calculating a total fuel amount data derived from summing the fueling events released for further processing, comparing the total fuel amount data with an issued total data provided by a fueling agent, and prohibiting further processing of at least one of the fueling events released for further processing based on a result of comparing the total fuel amount data with the issued total data provided by the fueling agent.

In various embodiments, the system may include a total fuel inventory module adapted for receiving or accessing inventory receipts and bills-of-lading over the time period, calculating a first total inventory amount data derived from summing the inventory receipts, calculating a second total inventory amount data derived from summing the bills-of-lading, comparing the first inventory amount data with the second inventory amount data, and prohibiting further processing of at least one supplier invoice associated with the second inventory amount data based on a result of comparing the first total inventory amount data with the second total inventory amount data.

In various embodiments of the invention, the fueling information is received or access by the fueling event module electronically over a communication network. In other embodiments of the invention, the fueling information is received or accessed by the fueling event module either locally or remotely via a different module, a database, a data warehouse, a file, or a storage device. In addition, in various other embodiments of the invention, the flight information is received or accessed by the fueling event module over a communication network. In other embodiments of the invention, the flight information is received or accessed by the fueling event module either locally or remotely via a different module, a database, a data warehouse, a file, or a storage device. In addition, in other embodiments of the invention, the fueling information comprises fuel ticket data. In other embodiments of the invention, the flight information comprises flight record data. In other embodiments of the invention, the issued total data is received or accessed by the total fuel uplifted module electronically over a communication network. In other embodiments of the invention, the issued total data is received or accessed by the total fuel uplifted module either locally or remotely via a different module, a database, a data warehouse, a file, or a storage device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention will now be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.
Brief Overview Various embodiments of the present invention provide systems and methods for fuel accounting and in particular verifying that fuel to be paid for has in fact been dispensed into equipment. In particular, various embodiments provide systems and methods to enable an organization operating aircraft to verify that a particular fueling event has occurred. One such embodiment involves the organization operating the aircraft receiving a first fuel amount data for a fueling event via a data pathway not under control of a fueling agent and a second fuel amount data derived from the fueling agent for the fueling event. The first fuel amount data is compared with the second fuel amount data to determine whether a fueling event has occurred and whether to release the first fuel amount data for reconciliation with the fueling agent.

Furthermore, various embodiments provide systems and methods to enable an organization operating aircraft to verify fuel uplifted for a selected period of time. One such embodiment involves repeating the steps to verify a fueling event has occurred for each proposed fueling event over the period of time and if it is determined that the fueling event did occur, releasing the fueling event for reconciliation. Also generating a first total fuel amount data by summing the fuel amount data related to the fueling events released for reconciliation for the period of time and receiving a second total fuel amount data from the fueling agent for the period of time. The first total fuel amount data is compared with the second total fuel amount data to determine whether to release to accounting the first fuel amount data associated with the fueling events released for reconciliation.

Figure 1:
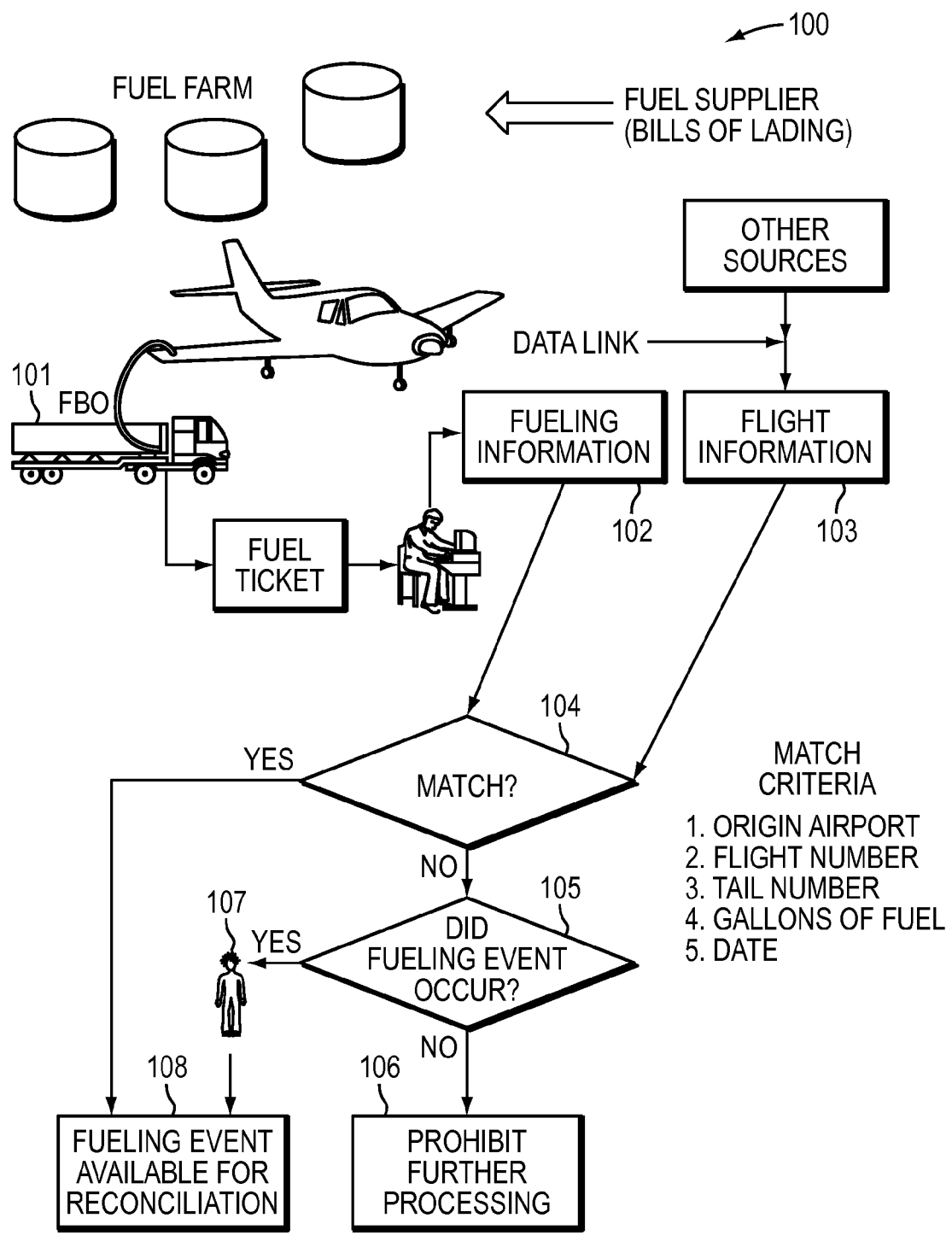
FIG. 1 is a flowchart illustrating a process to verify a fueling event according to an embodiment of the invention.

Lastly, various embodiments provide systems and methods to enable an organization operating aircraft to verify fuel inventory for a selected period of time. One such embodiment involves receiving inventory receipts for fuel purchased over the selected period of time from the fueling agent, in addition to bills-of-lading issued from a fuel supplier related to the fuel purchased over the period of time. The inventory receipts and bills-of-lading are summed to generate a first total inventory amount data and second inventory amount data, respectively, and are compared to determine whether to release to accounting the supplier invoices related to the second inventory amount data.
Fueling Event Verification Method An exemplary fueling event verification process 100 according to various embodiments of the invention is shown in FIG. 1. Various embodiments may begin with an aircraft stopping at an airport for refueling and the aircraft is fueled by a fueling agent, as shown in Step 101. For example, in one embodiment, the fueling agent may be a fixed base operator ("FBO"). Specifically, fuel farms exist in various parts of the world in which organizations operating aircraft purchase jet fuel from a supplier, such as Shell or Chevron/Texaco, and the purchased fuel is delivered to the fuel farm along with a bill-of-lading. Therefore, the fuel farm consists of a number of organization's fuel consolidated into tanks in which an organization owns a percentage of the fuel inventory held in the tanks based on their individual fuel purchases. In addition, the FBO serves as an onsite vendor that manages the fuel inventory and typically pumps the fuel into the aircraft. Thus, in process 100, the FBO drives a fuel dispenser truck out to the airport and processes fuel, i.e., uplifts fuel, into the aircraft sitting at the airport.

However, it should be understood that various other embodiments do not necessarily involve a fuel farm run by a FBO. For example, other embodiments may be practiced in conjunction with an independent fueling location wherein organizations operating aircraft do not store an inventory of fuel in consolidated tanks, but simply, the fuel inventory is owned by an independent organization who sells the fuel. Therefore, it should be understood that the fuel farm managed by an FBO is simply used as an example of various embodiments throughout this document in order to illustrate the invention.

Next, in Step 102, the fueling agent reads the amount of fuel dispensed into the aircraft and provides fueling information for the particular fueling event to the organization operating the aircraft. In one embodiment, this can be accomplished by the FBO reading the beginning and ending meter readings on the fuel dispenser truck or reading the total number of gallons dispensed and producing a fuel ticket, either electronically or manually, and presenting the fuel ticket to an airline employee at the airport. In many instances, the fuel ticket will provide additional information such as origin airport, flight number, tail number, date, or various other information related to the fueling event. In an alternative embodiment, the fuel ticket information is transmitted by radio frequency ("RF") technology to the airline's computer system from a hand-held device or directly from the fuel dispenser truck. The fuel ticket data can be entered into the airline's computer system by several manners such as key-entering the data by an airline employee, electronic transmission over a communication network (e.g., Internet or private network), or by RF technology. For example, the airline employee may be provided with a Ticket Add interface in which the employee enters the information found on the fuel ticket and clicks the "Save" button.

In conjunction, at Step 103, the organization operating the aircraft receives or accesses flight information by a data pathway not under control of the fueling agent. In various embodiments, the organization receives or accesses the flight information via a number of different data links. For example, in one embodiment, this step can be accomplished by receiving flight information directly from the aircraft by downloading flight record data from the aircraft's Aircraft Communications Addressing and Reporting System ("ACARS") through electronic or wireless technology, or by flight data coupons into the airline computer system. In other embodiments, the organization receives or accesses the flight information as aircraft data through various other systems such as the legacy flight service system for the airline. In addition, various embodiments may access or receive information such as flight number, airport, or date from the airline's system used to schedule all aircraft over a communication network (e.g., Internet or private network). In other embodiments, the organization receives or accesses the flight information either locally or remotely from a database, data warehouse, file, or other storage device of the airline computer system. For example, in one embodiment, equipment information and aircraft tail numbers may be stored in a database in which such information is received or accessed and used for validation purposes. Lastly, various embodiments may access or receive industry information from public references such as the International Air Transport Association ("IATA") and the Federal Aviation Administration ("FAA") that may be used for validation purposes.

After obtaining both the fueling information from the fueling agent and flight information via a data pathway not under control of the fueling agent, a comparison between the two sets of information is performed to look for a match, as shown in Step 104. This step can be accomplished in a number of ways as will be apparent to one of ordinary skill in the art. For example, in one embodiment the two sets of information can be manually compared by an airline employee or in another embodiment the two sets of information are entered, received, or accessed by the computer system and the system performs the comparison and determines whether a match exists. Comparison criteria may include many different types of information such as origin airport, flight number, tail number, date, gallons of fuel, or any combination of this information. In addition, various embodiments may employ various tolerance levels for the various criteria.

If a match is found to only one flight, the fueling event is made available for reconciliation with the fueling agent, as shown in Step 108. In various embodiments, the fueling information is simply stored electronically and is ready for reconciliation. In other embodiments, this simply entails paying the invoice for the fueling event. In other embodiments, the fueling event is made available to verify the amount of fuel dispensed for the fueling event with the fueling agent. For example, the fueling event data for a period of time can be supplied in a report through various channels such as a website, a monitor, an e-mail, or a facsimile to the FBO or airline personnel to verify the fuel dispensed for each fueling event with other data supplied by the FBO.

If more than one flight is found to match, no flight is found to match, or a flight is found to only partially match, e.g., some of the criteria match while other criteria does not match, the particular fueling event is further investigated to determine whether it occurred or not, as shown in Step 105. The investigation can be performed in one embodiment by an airline employee further looking at the fueling information received from the fueling agent and matching it manually to flight information gathered from various aircraft. In another embodiment the computer system can further conduct this investigation by receiving or accessing additional flight information, such as departure time, arrival time, out of the gate time, or into the gate time and comparing this information to the fueling information received from the fueling agent. Or in an alternative embodiment, the computer system can use a secondary set of criteria to establish a match. For example, the primary set of criteria can be to match flight number, tail number, date, and gallons of fuel being within ten gallons. If a match is not found using the primary criteria, the computer system resorts to a second set of criteria such as origin airport, departure time, date, and gallons of fuel being within ten gallons.

If it is determined from the investigation that the fueling event did not occur, the fueling event is prohibited from further processing, as shown in Step 106. In one embodiment of the invention, this step can be carried out by an airline employee investigating the source of the fuel ticket and deleting the fuel ticket in order to prohibit payment or in another embodiment a computer system can put the fuel ticket on hold, produce a report listing the discrepancy, or automatically delete the fuel ticket from the system to prohibit payment.

If it is determined from the investigation that the fueling event did occur, the fueling event is approved in Step 107 and made available for reconciliation with the fueling agent as shown in Step 108. In one embodiment, this step is carried out manually by an employee of the airline who was not involved with entering the fueling information. This ensures that a second person reviews the data entered by the first person, providing greater assurance that the fueling information was accurately entered into the computer system. In another embodiment, the fuel ticket is simply released automatically by the computer system.

Fuel Uplifted Verification Method

Figure 2:
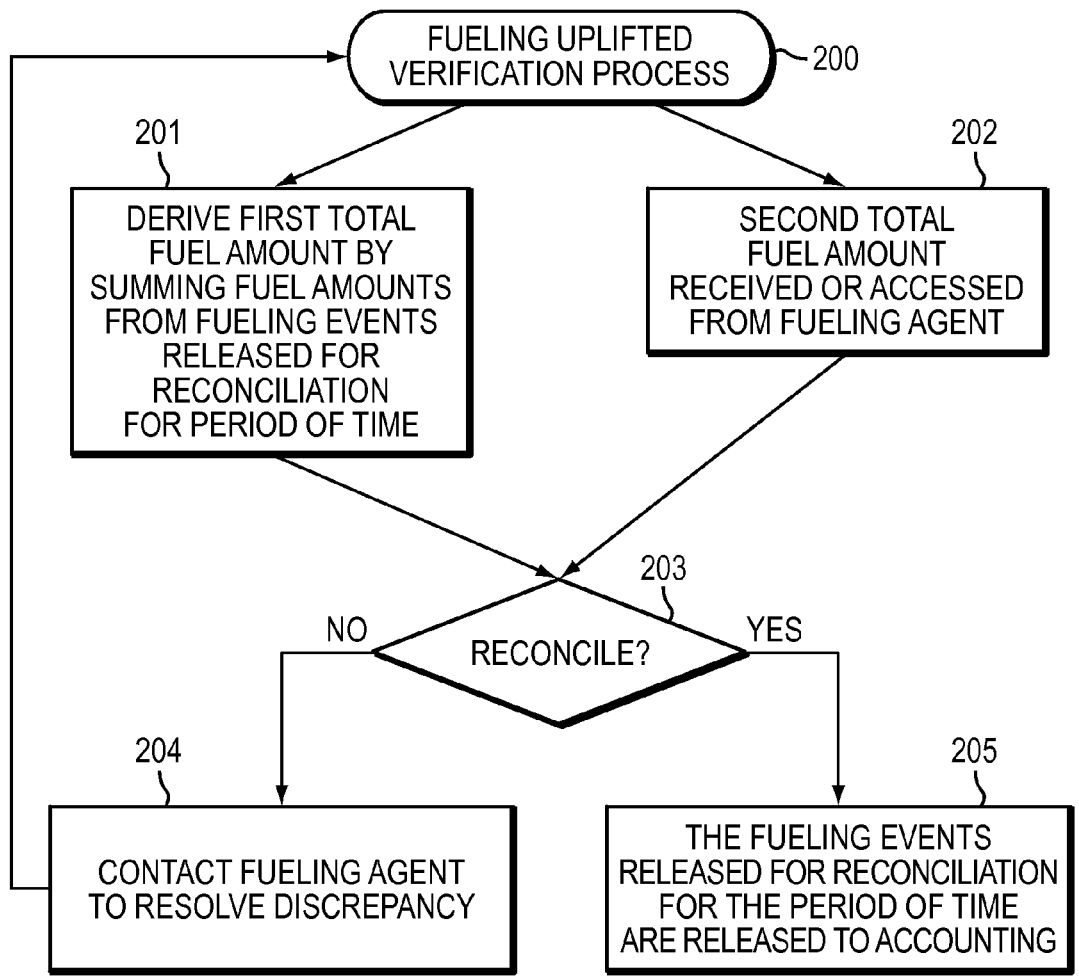
FIG. 2 is a flowchart illustrating a process to verify fuel uplifted according to an embodiment of the invention.

An exemplary fuel uplifted verification process 200 according to various embodiments of the invention is shown in FIG. 2. Various embodiments may begin with determining a first total fuel amount for a selected period of time by summing up the fuel amounts from the fueling events released for reconciliation for the period of time, as shown in Step 201. For example, in various embodiments, the first total fuel amount is found by summing the fuel amounts found on the fuel tickets released for reconciliation for the day. In one embodiment, the summing process can be performed manually by an airline employee summing up the amounts on the fuel tickets or in an alternative embodiment, the fuel ticket amounts may be entered manually or electronically into a computer system and the system sums up the amounts. In other alternative embodiments, a computer system can receive or access the fuel ticket amounts either locally or remotely from various sources such as a database, data warehouse, file, or other storage device and sum up the amounts to generate a total fuel amount.

In conjunction, at Step 202, a second total fuel amount is issued and received or accessed for the selected period of time from the fueling agent. In one embodiment, for example, the FBO issues a total amount of fuel dispensed for the day and transmits the total to the airline via a communication network (e.g., the Internet or private network), phone, mail, e-mail, or facsimile. This information can be received or accessed either manually by an airline employee or received or accessed directly by a computer system. In another embodiment, the FBO transmits the FBO's ending fuel inventory for the day by similar channels.

The first total fuel amount is compared to the second total fuel amount to determine if the two amounts reconcile, as shown in Step 203. In various embodiments, this comparison is performed in many different ways as will be apparent to one of ordinary skill in the art. For example, in one embodiment, the second total fuel amount received from the FBO is the FBO's ending fuel inventory for the day. In conjunction, the previous day's ending fuel inventory is received or accessed. In addition, the bills-of-lading from the FBO for the day are received or accessed and summed. Thus, an ending fuel inventory for the day is calculated by taking the previous day's ending fuel inventory, adding the bills-of-lading summed total, and subtracting the first total fuel amount. This calculated value is compared to the second total fuel amount to see if the difference between the two values falls within a predetermined tolerance. In various embodiments, this step can be performed manually by an airline employee or automatically by a computer system.

If the first total fuel amount and the second total fuel amount do not reconcile, the fueling agent is contacted to resolve the discrepancy, as shown in Step 204. In one embodiment, this constitutes an airline employee contacting the FBO by phone, e-mail or by facsimile, for example, and discussing the discrepancy. For instance, the FBO may have erroneously included fuel dispensed into another organization's aircraft into the total amount of fuel dispensed for the day in which case resolving the discrepancy involves simply correcting this value. Once the discrepancy has been resolved, the process of verifying fuel uplifted for the time period is repeated.

If the first total fuel amount and the second total fuel amount do reconcile, the fueling events released for reconciliation for the period of time are released to accounting, as shown in Step 205. For example, in one embodiment, the airline reconciles and validates the fuel tickets for the day using FBO distributed information and issues the fuel tickets to accounting either manually or through a computerized automated process.

Fuel Inventory Verification Method

Figure 3:
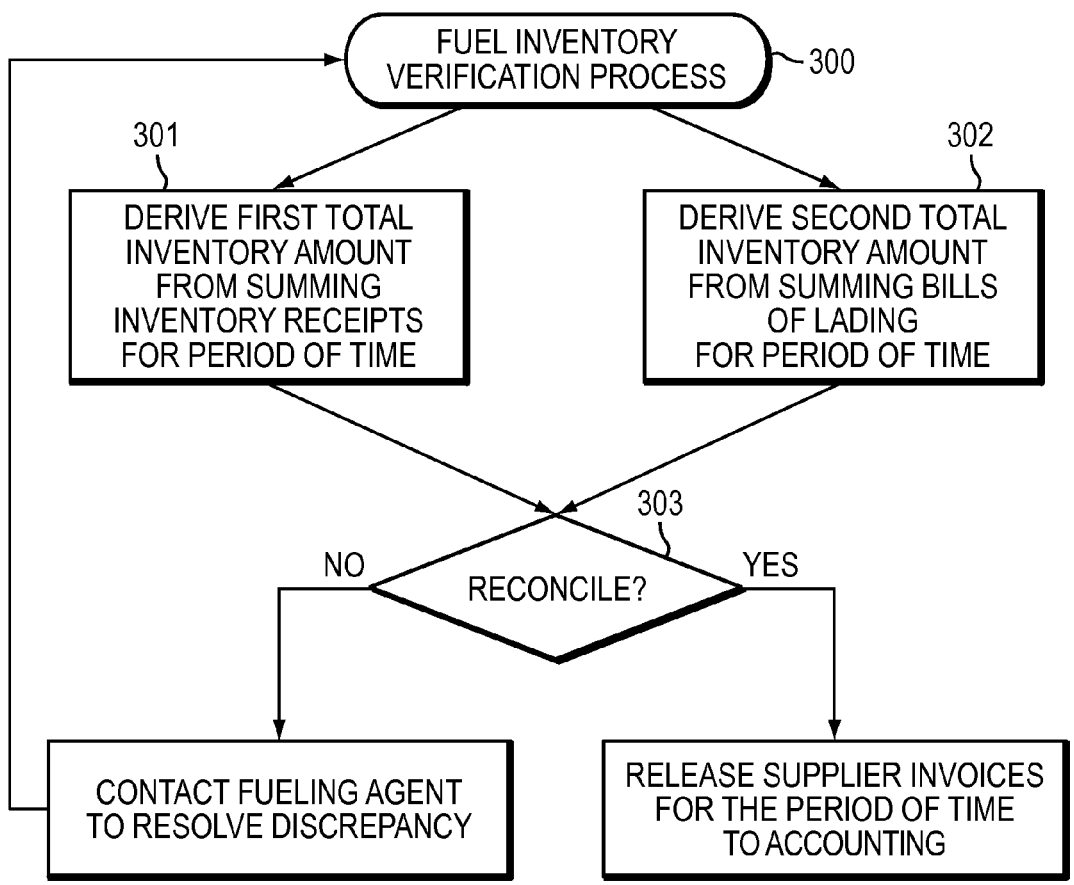
FIG. 3 is a flow chart illustrating a process to verify fuel inventory according to an embodiment of the invention.

In addition to verifying fuel uplifted, fuel inventory may also be verified. Thus, an exemplary fuel inventory verification process 300 according to various embodiments of the invention is shown in FIG. 3. Various embodiments may begin with determining a first total inventory amount for a selected period of time by summing up the fuel receipts for the fuel that was received into inventory for the period of time, as shown in Step 301. For example, in various embodiments, the first total inventory amount is found by summing the inventory receipts stated on an inventory statement received from the FBO on a daily basis. In one embodiment, the summing process can be performed manually by an airline employee summing up the receipt amounts or in an alternative embodiment, the receipts amounts may be entered manually or electronically into a computer system and the system sums up the amounts. In other alternative embodiments, a computer system can receive or access the receipt amounts either locally or remotely from various sources such as a database, data warehouse, file, or other storage device and sum up the amounts.

In conjunction, at Step 302, a second total inventory amount is determined for the selected period of time. In various embodiments, the second total inventory amount is calculated by summing the bills-of-lading issued by the fuel supplier for the selected period of time. For example, in various embodiments, the bills-of-lading are received via a communication network (e.g., the Internet or private network), phone, e-mail, mail or facsimile directly from the fuel supplier or from the FBO and summed. In one embodiment, the summing process can be performed manually by an airline employee summing up the bills-of-lading amounts or in an alternative embodiment, the bills-of-lading amounts may be entered manually or electronically into a computer system and the system sums up the amounts. In other alternative embodiments, a computer system can receive or access the bills-of-lading amounts either locally or remotely from various sources such as a database, data warehouse, file, or other storage device and sum up the amounts.

Next, the first total inventory amount is compared to the second total inventory amount to determine if the two amounts reconcile, as shown in Step 303. If the first total inventory amount and the second total inventory amount do not reconcile, the fueling agent is contacted to resolve the discrepancy, as shown in Step 304. In one embodiment, this constitutes an airline employee contacting the FBO by phone, e-mail or by facsimile, for example, and discussing the discrepancy. For instance, a fuel ticket may have been erroneously prepared by the FBO in which case resolving the discrepancy involves simply correcting the bill-of-lading. Once the discrepancy has been resolved, the process of verifying fuel inventory for the time period is repeated.

If the first total inventory amount and the second total inventory amount do reconcile, the supplier invoices for the selected period of time are released to accounting, as shown in Step 305. In various embodiments, this may be accomplished either manually or through a computerized automated process.

System Architecture

The fuel accounting system can be incorporated into an organization operating aircraft's system in numerous ways. In one embodiment, the fuel accounting system can be connected to a legacy system via a network (e.g., a LAN, the Internet and/or private network). In another embodiment the fuel accounting system may be a stand-alone system. The fuel accounting system can also receive or access data and communicate in various ways such as in various embodiments the data is entered directly into the system either manually or via a network connection. In other embodiments the data is received or accessed by communicating either to a local or remote system such as a database, data warehouse, accounting system, other module, file, or storage device.

Figure 4:
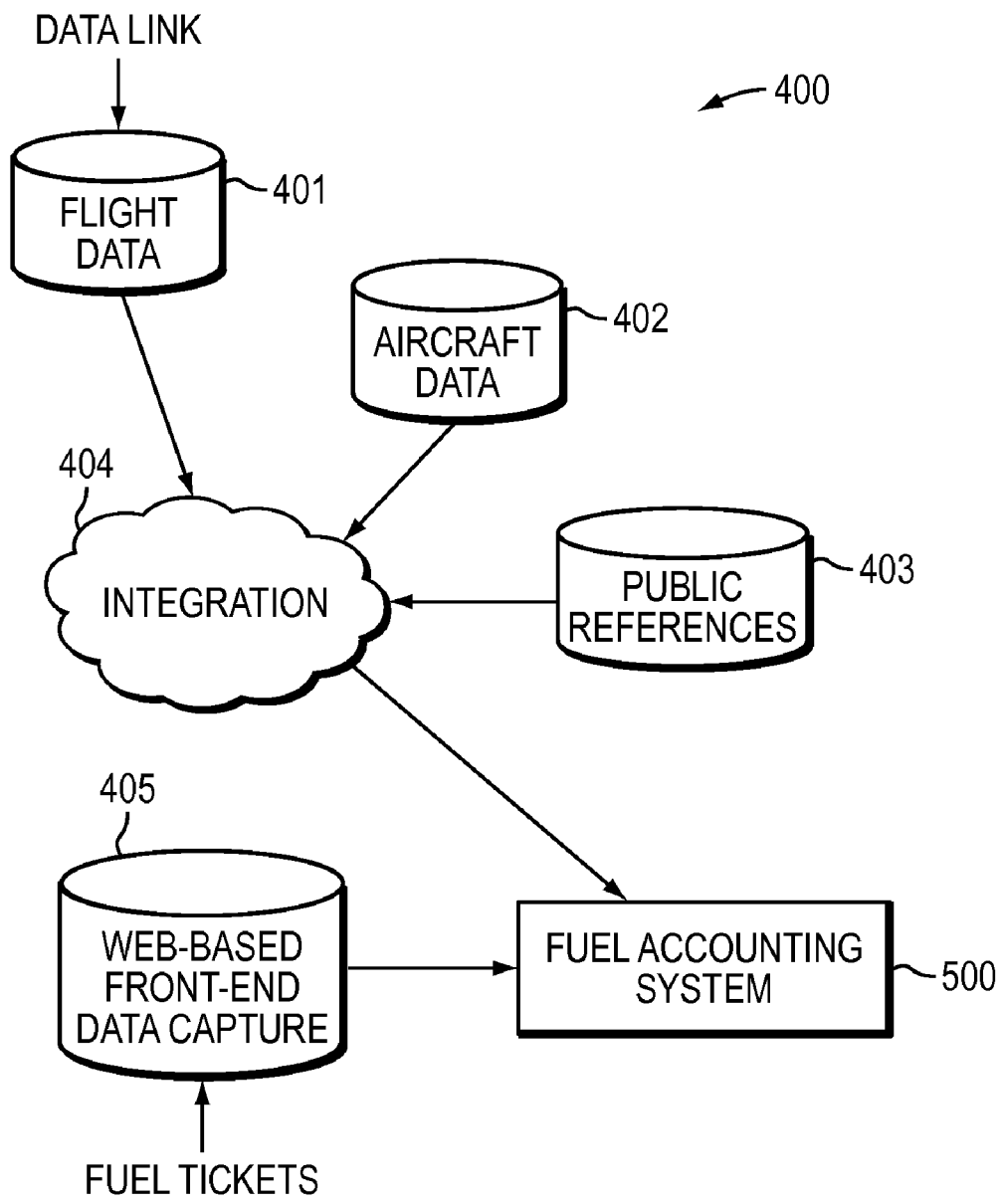
FIG. 4 is a schematic diagram illustrating system architecture according to an embodiment of the invention.

FIG. 4 shows a schematic of a system architecture 400 that includes the fuel accounting system according to various embodiments of the invention. Generally, the system architecture 400 is configured to access or receive and integrate various data to provide the fuel accounting system 500 with the information necessary to validate fueling events, total fuel uplifted, and total fuel inventory. In several embodiments, this data is stored on various storage devices, such as a hard disk drive, a floppy disk drive, a CD Rom drive, a DVD Rom drive, a USB flash drive, or optical disk drive, for storing information on various computer-readable media, such as a hard disk, a removable magnetic disk, a CD-ROM disk, or a DVD-ROM disk. The various data may be stored on a single storage device or may be stored on separate storage devices. In addition, in various embodiments, this data may compose a database or simply be stored as a file or group of files.

In several embodiments, the various data includes flight data 401 that may be provided by numerous sources, such as, for example, the aircraft's ACARS. In various embodiments, the aircraft data 402 includes such information as aircraft equipment and tail numbers, and public references 403 that includes industry information such as airport runway and schedule data from various sources such as the IATA or the FAA. As mentioned above, the various data is integrated to provide the fuel accounting system 500 with the information necessary to validate fueling events, total fuel uplifted, and total fuel inventory.

Integration 404 may be achieved in numerous ways in various embodiments, as will be apparent to one of ordinary skill in the art. For example, in one embodiment, integration 404 is achieved via a queuing and routing program that receives and routes the various data to the fuel accounting system 500. In another embodiment, integration 404 is achieved by storing the various data on one device. In another embodiment, integration 404 is achieved by simply connecting the various data storage devices via a communication network. Yet, in another embodiment, integration 404 is achieved via a server that collects the data from the various data sources and provides the data to the fuel accounting system 500.

In addition, in various embodiments, the fuel ticket data is provided to fuel accounting system 500 via a web-based front-end data capture system 405 that is used by an airline employee at the airport to enter the fuel ticket data. The employee simply calls up the web page over a communications network, such as the Internet, enters the fuel ticket data, and selects the "Save" button. In one embodiment, the web-based front-end data capture system 405 saves the fuel ticket information to a storage device that is in communication with the fuel accounting system 500. In another embodiment, the web-based front-end data capture system 405 sends the fuel ticket data directly to the fuel accounting system 500.

Figure 5:
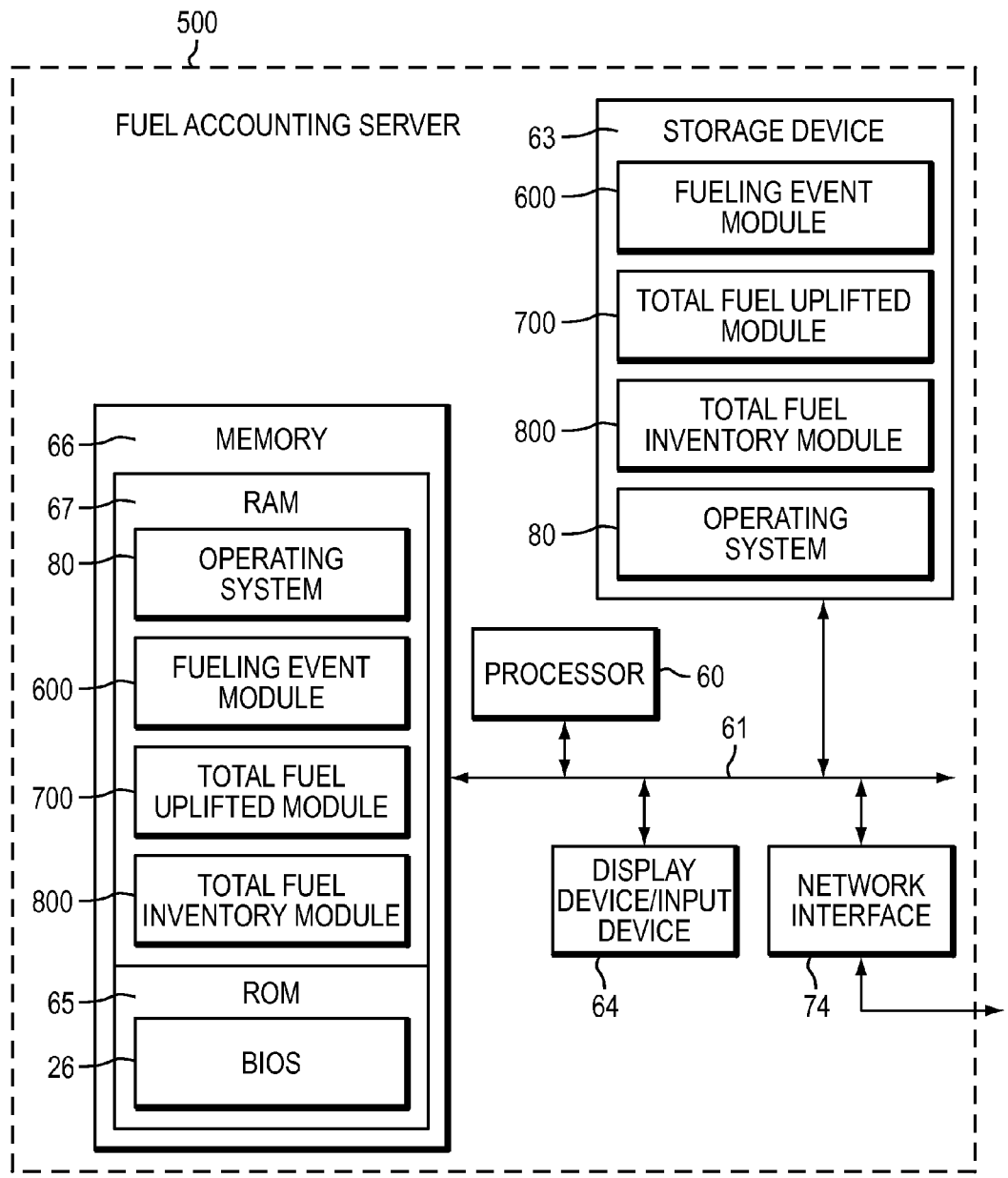
FIG. 5 is a schematic diagram illustrating a fuel accounting server according to an embodiment of the invention.

FIG. 5 shows a schematic diagram of a fuel accounting system 500 according to one embodiment of the invention. The fuel accounting system includes a processor 60 that communicates with other elements within the computer system via a system interface or bus 61. Also included in the system 500 is a display device/input device 64 for receiving and displaying data. This display device/input device 64 may be, for example, a keyboard or pointing device that is used in combination with a monitor. The system 500 further includes memory 66, which includes both read only memory (ROM) 65 and random access memory (RAM) 67. The system's ROM 65 is used to store a basic input/output system 26 (BIOS), containing the basic routines that help to transfer information between elements within the system 500. Alternatively, the fuel accounting system 500 can operate on one computer or on multiple computers that are networked together.

In addition, the system 500 includes at least one storage device 63, such as a hard disk drive, a floppy disk drive, a CD Rom drive, a DVD Rom drive, a USB flash drive, or optical disk drive, for storing information on various computer-readable media, such as a hard disk, a removable magnetic disk, a CD-ROM disk, or a DVD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. For example, as shown in FIG. 5, program modules of the fuel accounting system 500 include an operating system 80, a fueling event module 600, a total fuel uplifted module 700, and a total fuel inventory module 800. The fueling event module 600, the total fuel uplifted module 700, and the total fuel inventory module 800 control certain aspects of the operation of the fuel accounting system 500, as is described in more detail below, with the assistance of the processor 60 and an operating system 80.

Also located within the system 500 is a network interface 74, for interfacing and communicating with other elements of a computer network. It will be appreciated by one of ordinary skill in the art that one or more of the system's components 500 may be located geographically remotely from other system components. Furthermore, one or more of the components may be combined, and additional components performing functions described herein may be included in the system 500.

Fueling Event Module

Figure 6:
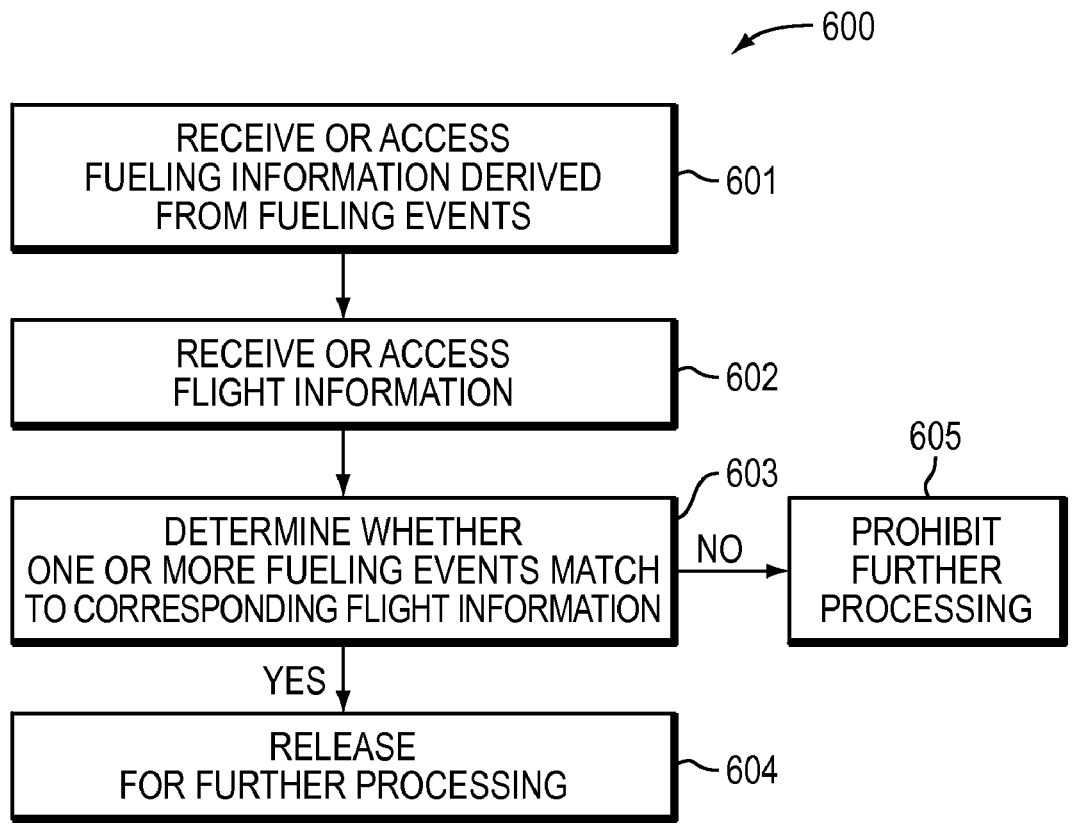
FIG. 6 is a flow diagram of a fueling event module according to an embodiment of the invention.

FIG. 6 illustrates a flow diagram of a fueling event module 600 according to various embodiments of the invention. This flow diagram may correspond to the steps carried out by a processor 60 in a fuel accounting system 500 shown in FIG. 5 as it executes the fueling event module 600 in the system's 500 RAM memory 67. Beginning at Step 601, the fueling event module 600 receives or accesses the fueling information for particular fueling events derived from a fueling agent. According to one embodiment, the fueling information is fuel ticket data key-entered into the system via a web page, as discussed above, in order for the fueling event module 600 to gain access. In an alternative embodiment, the fueling event module 600 receives or accesses the fueling information via a communications network (e.g., Internet or private network) or a transmission from the fuel dispenser truck through RF technology. In another embodiment, the fueling event module 600 receives or accesses the fueling information either locally or remotely from various sources such as a different module, database, data warehouse, file, or some other storage device.

In Step 602, the fueling event module 600 receives or accesses the corresponding flight information for the fueling data. As previously discussed, various embodiments receive flight information that derives from flight data, aircraft data, and public references that has been integrated. In addition, fueling event module 600 may receive or access this data in numerous ways. For example, according to one embodiment, the flight information is flight data received through various channels such as the aircraft's ACARS sending the data electronically or a flight data coupon that is manually entered into the system. In other embodiments, the fueling event module 600 receives or accesses the flight information via a communications network (e.g., Internet or private network) or RF technology. In still other embodiments, the fueling event module 600 receives or accesses the flight information through a legacy flight service system, scheduling system, or either locally or remotely from various sources such as a different module, database, data warehouse, file, some other storage device, or external source.

In Step 603, the fueling event module 600 determines whether one or more fueling events identified by the fueling information match to corresponding flight information. Various matching criteria may be employed as will be apparent to one of ordinary skill in the art. For example, according to various embodiments, this step is carried out by matching data such as origin airport, or flight number, or aircraft tail number, or gallons of fuel, or date. In addition, in various embodiments, tolerance levels may be established within the fueling event module 600 to apply to the matching criteria. For instance, the fueling event module 600 determines that a fueling event is valid if the origin airport, flight number and date is an exact match and the gallons of fuel are within ten gallons. Of course, other tolerance levels may be used depending on the degree of accuracy desired by the user.

If in Step 603 the fueling event module determines that one or more fueling events are valid, the fueling events are released for further processing as shown in Step 604. Likewise, any fueling events determined to be invalid are prohibited from further processing as shown in Step 605. In various embodiments, further processing can have numerous meanings such as released to accounting for payment, batching for further approval, or making the fueling events available for reconciliation with fueling agent data. In turn, in various embodiments, prohibiting further processing can have numerous meanings, such as putting the fueling event on hold, printing a report to highlight the discrepancy, or deleting the fueling event from the system to ensure further processing is prohibited. One of ordinary skill in the art can envision many other measures encompassed in prohibiting further processing.

Total Fuel Uplifted Module

Figure 7:
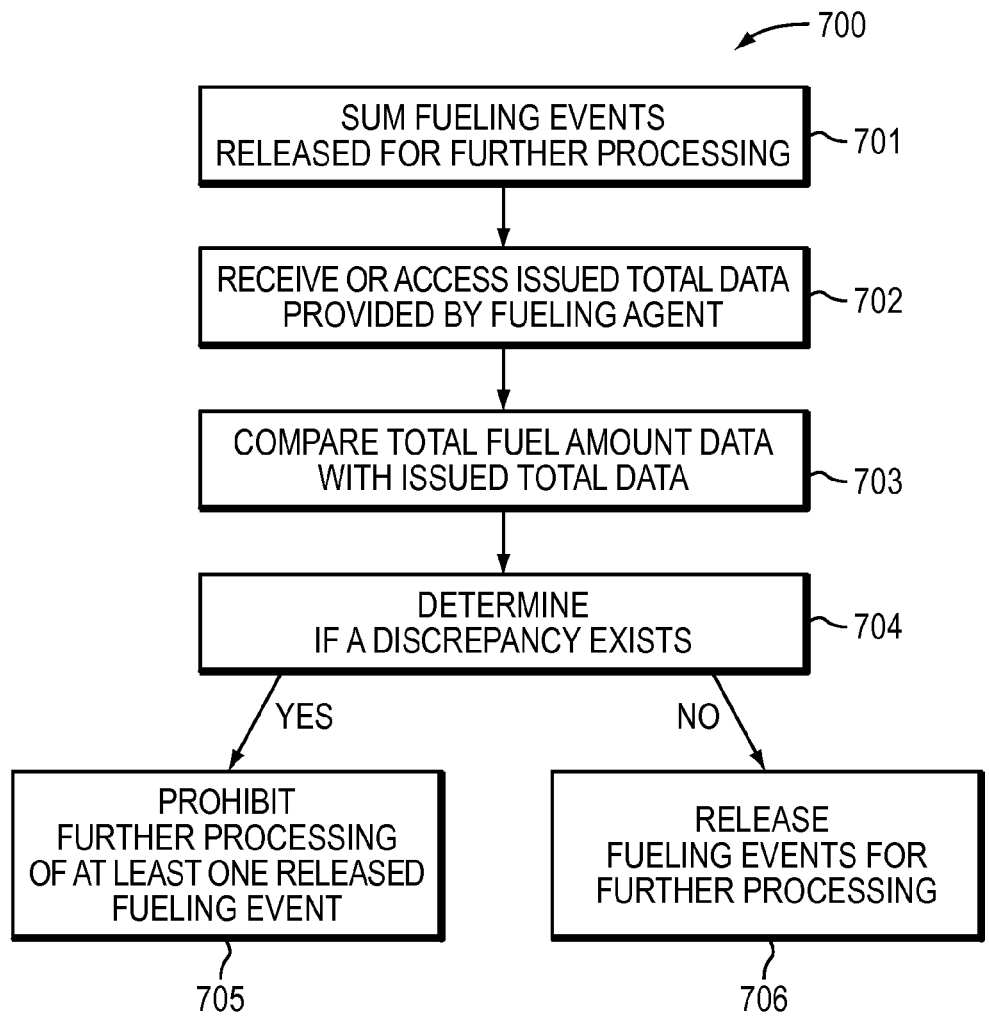
FIG. 7 is a flow diagram of a total fuel uplifted module according to an embodiment of the invention.

FIG. 7 illustrates a flow diagram of a total fuel uplifted module 700 according to various embodiments of the invention. This flow diagram may correspond to the steps carried out by a processor 60 in a fuel accounting system 500 shown in FIG. 5 as it executes the total fuel uplifted module 700 in the system's 500 RAM memory 67. Beginning at Step 701, the fuel amounts for the fueling events released for further processing are summed to provide a total fuel amount data. In one embodiment, the released fuel amounts are supplied by the fueling event module 600. In other embodiments, the released fuel amounts are entered either manually by an airline employee or automatically through electronic channels such as a communications network (e.g., Internet or private network) or received or accessed either locally or remotely from various sources such as a different module, database, data warehouse, file, or other storage device.

In Step 702, the total fuel uplifted module 700 receives or accesses an issued total data provided by the fueling agent. In various embodiments, the issued total data provided by the fueling agent can represent several different amounts such as the total amount of fuel dispensed by the fueling agent for a period of time or the fueling agent's ending inventory for a period of time. In addition, in various embodiments, the issued total data can be entered into the system in several different ways. The issued total data may be key-entered into the system via a web page, entered into the system electronically via a communications network (e.g., Internet or private network), or received or accessed either locally or remotely from various sources such as a different module, database, data warehouse, file, storage device, or the fueling agent's network or Web site.

Once the total fuel amount data has been determined and the fueling agent's issued total data has been obtained, the two amounts are compared, as shown in Step 703. As will be apparent to one of ordinary skill in the art, numerous comparison models can be developed in various embodiments. For example, in one embodiment, the total fuel uplifted module 700 receives or accesses the previous day's ending fuel inventory. This value may be stored on the system or received or accessed either locally or remotely from various sources such as a different module, database, data warehouse, file, storage device, or independent accounting system. The fuel uplifted module also receives or accesses and sums the fueling agent's bills-of-lading for the day. Again this information may be entered either manually or automatically into the system or received or accessed locally or remotely from various sources. The total fuel uplifted module 700 calculates the ending fuel inventory for the day by taking the previous day's ending fuel inventory, adding the bills-of-lading summed total, and subtracting the released fueling events summed total. In addition, the total fuel uplifted module 700 compares in Step 703 the calculated value to the fueling agent's issued total data, which in this case represents the fueling agent's ending inventory, to see if the difference between the two values falls within a predetermined tolerance.

If a discrepancy is found in Step 704 from the comparison in Step 703, the total fuel uplifted module 700 prohibits further processing of a least one of the released fueling events, as shown in Step 705. Various embodiments can handle this result several different ways. In one embodiment, the total fuel uplifted module 700 prohibits payment on at least one of the released fueling events. In another embodiment, a "red flag" is triggered such as putting at least one of the released fuel tickets on hold, automatically printing a report or sending an e-mail to an airline employee. Again, it should be apparent to one of ordinary skill in the art that a number of different mechanisms can be utilized to draw attention to the discrepancy.

If a discrepancy is not found in Step 704 from the comparison in Step 703, the total fuel uplifted module 700 releases the fueling events for further processing, as shown in Step 706. For example, in one embodiment, the fueling events are released to an accounting system to be reconciled and validated with distributed information from the fueling agent and issued for payment.

Total Fuel Inventory Module

Figure 8:
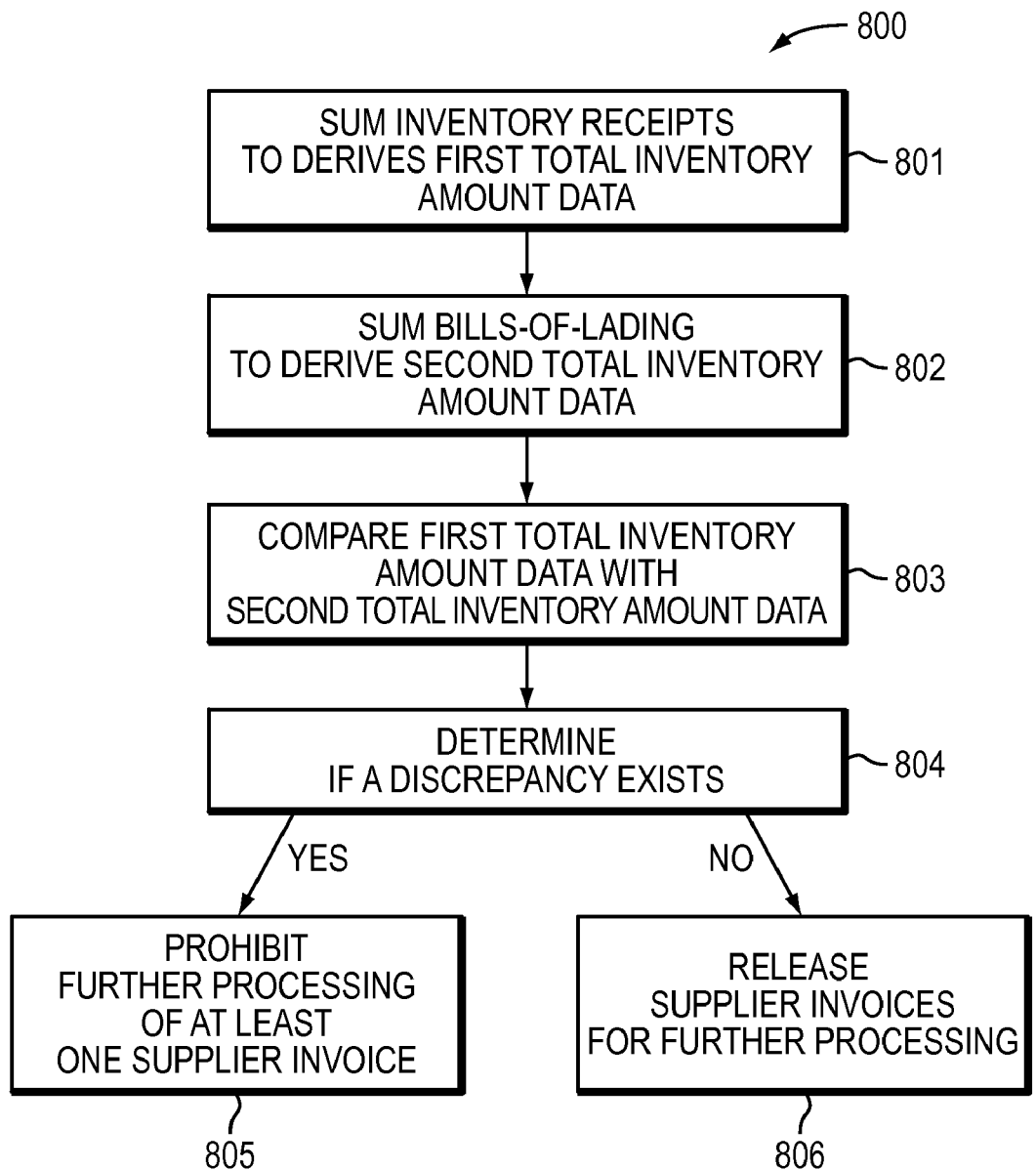
FIG. 8 is a flow diagram of a total fuel inventory module according to an embodiment of the invention.

FIG. 8 illustrates a flow diagram of a total fuel inventory module 800 according to various embodiments of the invention. This flow diagram may correspond to the steps carried out by a processor 60 in a fuel accounting system 500 shown in FIG. 5 as it executes the total fuel inventory module 800 in the system's 500 RAM memory 67. Beginning at Step 801, the fuel receipts released from the fueling agent are summed over a specific period of time to provide a first total inventory amount data. In various embodiments, the fuel receipts are supplied by the fueling agent via several different ways such as over a communications network (e.g., Internet or private network), e-mail, facsimile, or mail. In addition, in various embodiments, the fuel receipts can be entered either manually by an airline employee or automatically through electronic channels such as a communications network (e.g., Internet or private network) or received or accessed either locally or remotely from various sources such as a different module, database, data warehouse, file, other storage device, or the fueling agent's network or Web site.

In Step 802, the total fuel inventory module 800 receives or accesses the bills-of-lading over the period of time and sums the bills-of-lading in order to provide a second total inventory data. In various embodiments, the bills-of-lading are provided by the fueling agent while in other embodiments, the bills-of-lading are directly provided by the fuel supplier. In addition, in various embodiments, the bills-of-lading can be entered into the system in several different ways. For example, in various embodiments, the bills-of-lading may be received via a communications network, e-mail, facsimile, or mail. In addition, in various embodiments, the bills-of-lading may be key-entered into the system via a web page, entered into the system electronically via a communications network (e.g., Internet or private network), or received or accessed either locally or remotely from various sources such as a different module, database, data warehouse, file, storage device, or the fueling agent's/fueling supplier's network or Web site.

Once the first total inventory data and second total inventory data have been determined, the two amounts are compared, as shown in Step 803. As will be apparent to one of ordinary skill in the art, numerous comparison models can be developed in various embodiments. In addition, various embodiments may utilize various tolerance levels. For example, the total fuel inventory module 800 compares in Step 803 the calculated values to see if the difference between the two values falls within a predetermined tolerance of 50 gallons.

If a discrepancy is found in Step 804 from the comparison in Step 803, the total fuel inventory module 800 prohibits further processing of a least one of the supplier invoices for specified period of time, as shown in Step 805. Various embodiments can handle this result several different ways. In one embodiment, the total fuel inventory module 800 prohibits payment on at least one of the supplier invoices. In another embodiment, a "red flag" is triggered such as putting at least one of the fuel receipts or supplier invoices on hold, automatically printing a report or sending an e-mail to an airline employee. Again, it should be apparent to one of ordinary skill in the art that a number of different mechanisms can be utilized to draw attention to the discrepancy.

If a discrepancy is not found in Step 804 from the comparison in Step 803, the total fuel inventory module 800 releases the supplier invoices for further processing, as shown in Step 806. For example, in one embodiment, the supplier invoices are released to an accounting system for payment.

As will be appreciated by one skilled in the art, the present invention may be embodied as a method, a data processing system, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, DVD-ROMs, USB flash drives, optical storage devices, or magnetic storage devices.

The present invention was described above with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for managing aircraft fuel, the method comprising the steps of:
   a) receiving a first fuel amount data for a fueling event from an Aircraft Communications Addressing and Reporting System (ACARS) located on an aircraft, the first fuel amount data representing one fueling event of a plurality of fueling events that have occurred over a selected period of time, each fueling event representing a fueling of a select aircraft of a plurality of aircrafts by a fueling agent;
   b) receiving a second fuel amount data derived from the fueling agent for the fueling event, the second fuel amount data comprising data originating from a fuel dispenser vehicle used to fuel the select aircraft;
   c) comparing the first fuel amount data and the second fuel amount data, by at least one computer processor, to determine whether one or more corresponding pieces of information from the first fuel amount data and the second fuel amount data match; and d) releasing the first fuel amount data for reconciliation with the fueling agent when the one or more corresponding pieces of information match.

2. A method as claimed in claim 1 further comprising the step of:

e) after releasing the first fuel amount data for reconciliation with the fueling agent, paying an invoice for the first fuel amount data.

3. A method as claimed in claim 1 further comprising the step of:

e) after releasing the first fuel amount data for reconciliation with the fueling agent, reporting the first fuel amount data to the fueling agent for verification.

4. A method as claimed in claim 1, wherein steps (a) through (d) are repeatedly performed for each fueling event of the plurality of the fueling events over the selected period of time, and the method further comprises the steps of:

e) generating, by the at least one computer processor, a first total fuel amount data by summing the first fuel amount data for each fueling event released for reconciliation over the period of time;

f) receiving a second total fuel amount data from the fueling agent;

g) comparing the first and second total fuel amount data, by the at least one computer processor, to determine whether the first total fuel amount data matches the second total fuel amount data within a predetermined tolerance; and h) releasing the first fuel amount data for each of the fueling events released for reconciliation over the period of time to accounting when the first total fuel amount data matches the second total fuel amount data within the predetermined tolerance.

5. A method as claimed in claim 4 further comprising the steps of:

i) receiving inventory receipts over the selected period of time issued by the fueling agent;

j) summing the inventory receipts to generate a first total inventory amount data;

k) receiving bills-of-lading over the selected period of time issued by a fuel supplier;

l) summing the bills-of-lading to generate a second total inventory amount data;

m) comparing the first and second total inventory amount data to determine whether the first total inventory amount data matches the second total inventory amount data within a second predetermined tolerance; and n) releasing supplier invoices related to the second total inventory amount data to accounting when the first total inventory amount data matches the second total inventory amount data within the second predetermined tolerance.

6. A method as claimed in claim 1, wherein step (c) is performed based on one or more of origin airport, flight number, tail number, gallons of fuel, or date in respective to the first and second fuel amount data.

7. A system for managing aircraft fuel, the system comprising:

at least one computer processor configured to:

a) receive a first fuel amount data directly from an Aircraft Communications Addressing and Reporting System (ACARS) located on an aircraft, the first fuel amount data representing one fueling event of a plurality of fueling events that have occurred over a selected period of time, each fueling event representing a fueling of a select aircraft of a plurality of aircrafts by a fueling agent;

b) receive a second fuel amount data derived from the fueling agent for the fueling event, the second fuel amount data originating from a fuel dispenser vehicle used to fuel the select aircraft;

c) compare the first fuel amount data and the second fuel amount data to determine whether one or more corresponding pieces of information from the first fuel amount data and the second fuel amount data match; and d) release the first fuel amount data for reconciliation with the fueling agent when the one or more corresponding pieces of information match.

8. A system as claimed in claim 7, wherein the at least one computer processor is further configured to:

e) repeat steps (a) through (d) for each fueling event of the plurality of fueling events over the selected period of time for the select aircraft;

f) generate a first total fuel amount data by summing the first fuel amount data for each fueling event released for further processing over the selected period of time;

g) receive a second total fuel amount data from the fueling agent;

h) compare the first total fuel amount data and the second total fuel amount data to determine whether the first total fuel amount data matches the second total fuel amount data within a predetermined tolerance; and i) release the first fuel amount data for each of the fueling events released for reconciliation over the period of time to accounting when the first total fuel amount data matches the second total fuel amount data within the predetermined tolerance.

9. A system as claimed in claim 7, wherein the at least one computer processor is configured to print a report identifying the fuel events associated with the first fuel amount data as not being available for reconciliation when the first total fuel amount data does not match the second total fuel amount data within the predetermined tolerance.

10. A system as claimed in claim 7, wherein the at least one computer processor is configured to:

transmit a verification of the fueling event to the fueling agent over a direct communication channel when the one or more corresponding pieces of information matches for the first fuel amount data and the second fuel amount data.

11. A system as claimed in claim 7, wherein the at least one computer processor is configured to:

receive inventory receipts over the selected period of time from the fueling agent;

sum the inventory receipts to generate a first total inventory amount data;

receive bills-of-lading over the selected period of time issued by a fuel supplier over the direct communication channel;

sum the bills-of-lading to generate a second total inventory amount data;

compare the first total inventory amount data and second total inventory amount data to determine whether the first total inventory amount data matches the second total inventory amount data within a predetermined tolerance;

identify supplier invoices related to the second total inventory amount data as being available for reconciliation when the first total inventory amount data matches the second total inventory amount data within the predetermined tolerance; and identify supplier invoices related to the second total inventory amount data as not being available for reconciliation when the first total inventory amount data does not match the second total inventory amount data within the predetermined tolerance.

12. A system as claimed in claim 11, wherein the at least one computer processor is configured to
print a report identifying supplier invoices related to the second total inventory amount data as not being available for reconciliation when the first total inventory amount data does not match the second total inventory amount data within the predetermined tolerance.

* * * * *